United States Patent [19]

Yamashina

[11] Patent Number: 4,982,491
[45] Date of Patent: Jan. 8, 1991

[54] METHOD AND APPARATUS FOR FITTING COIL SPRINGS

[75] Inventor: Yasuhiro Yamashina, Kanagawa, Japan

[73] Assignee: Fuji Photo Film Co., Ltd., Kanagawa, Japan

[21] Appl. No.: 421,936

[22] Filed: Oct. 16, 1989

[30] Foreign Application Priority Data

Oct. 17, 1988 [JP] Japan .................. 63-261113

[51] Int. Cl.$^5$ ............................................. B23P 11/00
[52] U.S. Cl. ....................................... 29/436; 29/450; 29/464
[58] Field of Search ................ 29/436, 450, 452, 464

[56] References Cited

U.S. PATENT DOCUMENTS 3,359,625 12/1967 Rossman ..................... 29/436
4,372,358 2/1983 Glore ........................ 29/436 X Primary Examiner—Timothy V. Eley
Attorney, Agent, or Firm—Young & Thompson

[57] ABSTRACT

Two components are interconnected with a helical extension spring. After attaching a helical extension spring to a first component, the spring is stretched to a predetermined length and the first component with the torsion spring maintained stretched at the predetermined length is held as an integral unit in a predetermined relative position to a second component. Thereafter, the first component with the stretched spring is fitted to the second component in a predetermined positional relationship.

2 Claims, 4 Drawing Sheets

F I G. 6
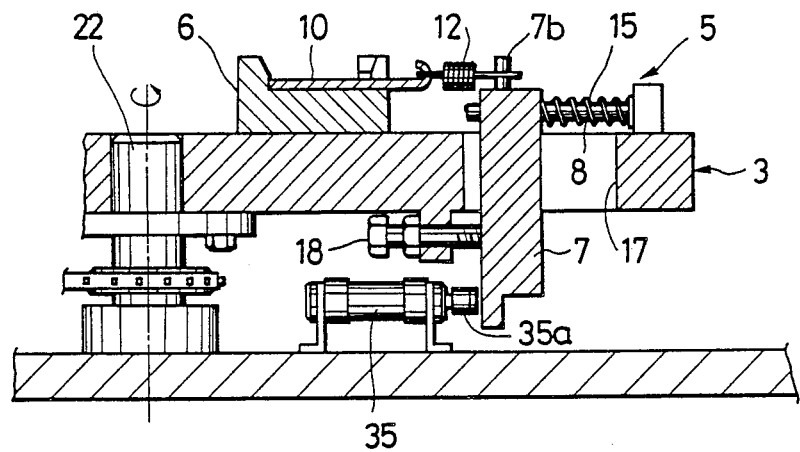

METHOD AND APPARATUS FOR FITTING COIL SPRINGS

BACKGROUND OF THE INVENTION

The present invention relates to a method and apparatus for interconnecting two components with a helical extension spring.

To stretch or load a helical extension spring between two components, the helical extension spring should be expanded to a required length so as to tension one component against the other component to which the first component is to be fitted for relative movement. The helical extension spring has heretofore been held between hooks and expanded to a required length by displacing the hooks apart from each other. Such a spring fitting method and an apparatus therefor is known from Japanese Patent Publ. No. 57-46980 (1982) or Japanese Unexam. Patent Publ. No. 61-95837 (1986).

It is thus generally known to expand and attach a helical extension spring between two components one of which is to be spring urged so as to be movable relative to the other component. In conventional methods, the component to be spring urged is first attached to the other component and thereafter, the helical extension spring is stretched and attached to the two components.

Before attaching the expanded helical extension spring to the two components, one of the two components has to be firmly held relative to the other component. For this purpose, it is necessary to use a holding jig or fixture, which results in an inferior operating efficiency and an inferior degree of fitting reliability.

OBJECTS OF THE INVENTION

It is, therefore, an object of the present invention to provide a method of fitting a helical extension spring to two components with a high operating efficiency and a high degree of fitting reliability.

It is a further object of the present invention to provide an apparatus for fitting a helical extension spring to two components with a high operating efficiency and a high degree of fitting reliability.

SUMMARY OF THE INVENTION

These and other objects of the present invention are achieved by a method and apparatus for fitting an expanded helical extension spring between two components, one fixed and the other movable. The component which is to be movable relative to the other component is placed onto a holding unit comprising a supporting table and a slidable block having a hook, which holding unit is disposed on a turntable. The turntable is intermittently turned so as to locate the holding unit at each of a component supplying position where the relatively movable component is placed on the supporting table, a spring attaching position where a helical extension spring is attached to this component and to the hook of the slidable block, and a component fitting position where this component with the helical extension spring can be attached to the other component, in this order. The slidable block is shifted so as to expand the helical extension spring to a predetermined length, upon arrival of the holding unit at the component fitting position from the spring attaching position.

Before fitting the first component to the second component, a helical extension spring is attached to the first component and stretched to a length sufficient to extend or be loaded between the first and second components. Accordingly, the first component and the expanded helical extension spring are fitted as one integral unit to the second component. This increases the efficiency of the fitting operation.

According to a preferred embodiment of the invention, the helical extension spring is automatically expanded to the desired length while the first component having the helical extension spring attached thereto is transferred from the spring attaching position to the component fitting position.

BRIEF DESCRIPTION OF THE DRAWINGS

The above and other objects and features of the present invention will be more readily apparent from the following description directed to particular preferred embodiments of the present invention, taken with reference to the accompanying drawings, in which:

FIG. 6 is a sectional view of an essential part of a helical extension spring fitting apparatus in accordance with another preferred embodiment of the present invention.

DETAILED DESCRIPTION OF PREFERRED EMBODIMENTS ACCORDING TO THE INVENTION

Figure 1:
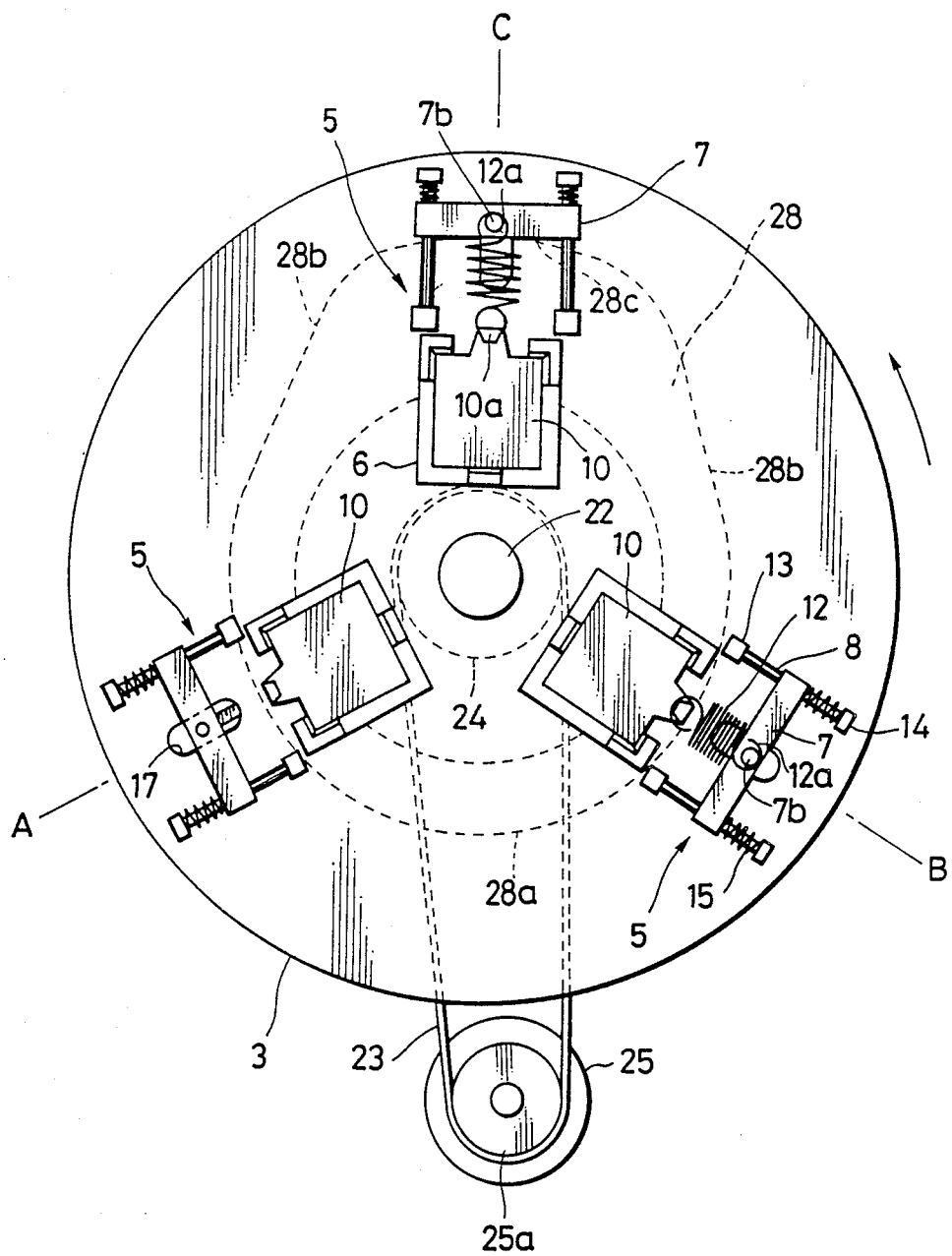
FIG. 1 is a plan view showing a helical extension spring fitting apparatus in accordance with a preferred embodiment of the present invention.
Figure 2:
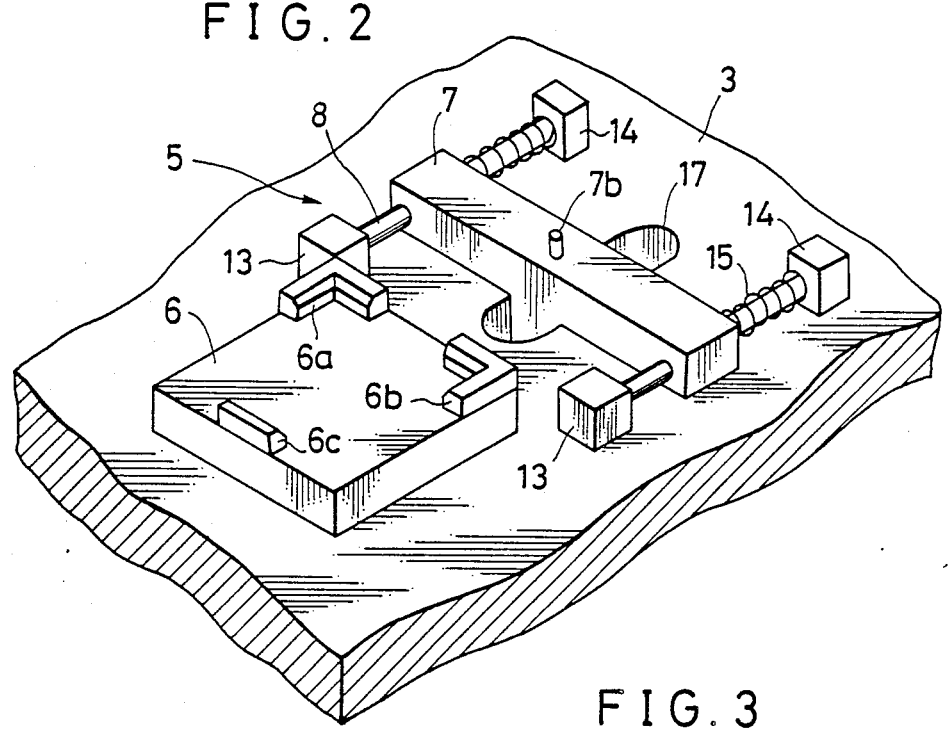
FIG. 2 is an isometric view of one of the holding units of the helical extension spring fitting apparatus of FIG. 1.
Figure 3:
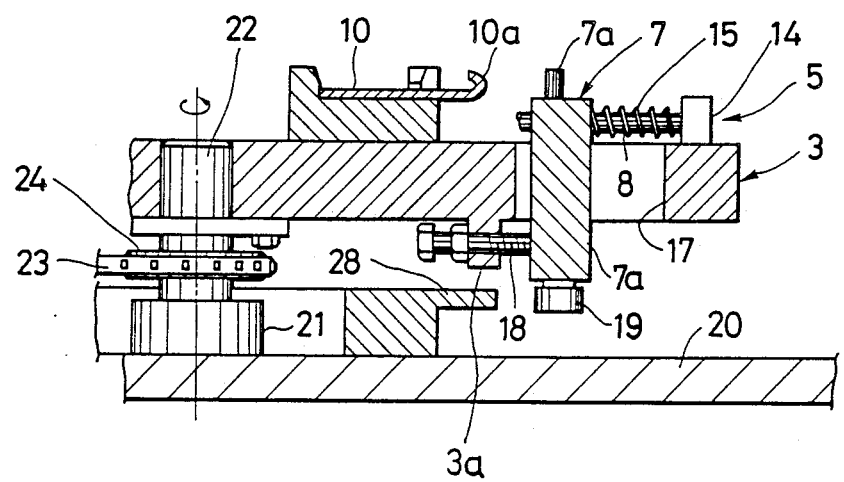
FIGS. 3 to 5 are explanatory sectional views showing a holding unit of the helical extension spring fitting apparatus of FIG. 1 at various stages of its rotation on index table 3, for easy understanding of functions.

Referring now to the drawings in detail, and in particular to FIGS. 1 and 3, a spring-loaded apparatus in accordance with the present invention is shown having a circular index table 3 rotatably supported by means of a rotary shaft 22. Index table 3 is provided in this embodiment with three spring loading units 5 arranged thereon at regular angular spacings of 120°. All of the spring loading units 5 are identical in structure and operation, and accordingly only one is shown in detail in FIG. 2.

Each spring loading unit 5 comprises a stationary rectangular work table 6 for holding one component thereon, such as a substantially rectangular shaped plate 10, to which component a helical extension spring 12 having hooked ends 12a is engaged. Each spring loading unit 5 further comprises a T-shaped slide block 7 supported by a pair of guide rods 8 for radial movement relative to index table 3. The stationary work table 6 is formed with angled front retainer projections 6a and 6b at both of its radially outward corners and a rear retainer projection 6c at its radially inward end, for positioning and firmly holding the plate 10 thereon. The slide block 7 is provided with a spring retainer stud pin 7b secured to the upper surface thereof, for engaging one hooked end 12a of the helical extension spring 12. A stem 7a of the T-shaped slide block 7 extends downward therefrom and projects through a radial slot 17 formed in the index table 3. Each guide rod 8 is securely supported by means of blocks 13 and 14 attached to the upper surface of the index table 3. Return coil springs 15 are mounted on the guide rods 8 between the block 14 and slide block 7, so as to urge the slide block 7 toward the center of the index table 3, and hence toward the work table 6.

As shown in FIG. 3, the index table 3 has a shaft 22 secured thereto which is rotatably supported by means of a bearing 21 firmly mounted on a base board 20. The shaft 22 has a sprocket wheel 24 securely mounted thereon. FIG. 1 shows the shaft 22 operationally coupled to a high torque motor 25 rotatable at a relatively low speed by means of a roller chain 23 stretched between the sprocket wheel 24 mounted on the shaft 22 and an output sprocket 25a of the motor 25, so as to rotate the index table 3 at a low speed.

The index table 3 is formed with a projection 3a extending downward from the under surface thereof and formed with female threads. An adjusting screw 18, which is adjustably threaded in the threaded hole of the projection 3a, is adapted to contact the stem 7a of the T-shaped slide block 7 so as to adjustably limit the radially innermost position of the T-shaped slide block 7 urged by the return coil springs 15. The stem 7a of the T-shaped slide block 7 is provided with a cam follower 19 rotatably mounted on the bottom of the stem 7a.

A peripheral cam plate 28, which is fixedly mounted on the base 20, is adapted to contact the cam followers 19 during rotation of index table 3. The cam profile of the peripheral cam 28 comprises a cam base 28a and a cam nose 28c interconnected by flanks 28b. Upon rotation of index table 3, the cam nose 28c forces the slide block 7 radially outwardly against the action of the return coil springs 15 and alternately places each of the three spring loading units 5 in a predetermined first radial position at a circumferential position C, referred to as the component fitting position. On the other hand, the cam base 28a places the remaining spring loading units 5 in predetermined second radial positions located radially inwardly of the first radial position at circumferential positions A and B, which are referred to as the component supplying position and the spring attaching position, respectively. The circumferential positions A-C are circumferentially disposed at regular angular spacings of 120°.

The plate 10, which is formed with a stud 10a engageable with one of the hooked ends 12a of the helical extension spring 12, is supplied to the spring loading unit 5 at the component supplying position A either manually or automatically by means of a parts feeder of a type well known in the art and which is thus not further described herein. The plate 10 is put on the work table 6 so as to be firmly held by the angled front retainer projections 6a and 6b and the rear retainer projection 6c.

Every time a plate 10 is put on one of the spring loading units 5 at position A, the motor 25 is actuated so as to turn the index table 3 through angle of 120° and then stops, thereby bringing the spring loading unit 5 with a plate 10 to the spring attaching position B and the spring loading unit 5 previously in the component fitting loading position C to the component supplying position A. A 120° movement of the index table 3 causes the slide block 7 of the spring loading unit 5 previously in the component fitting position C to slide radially inwardly under the action of the return coil springs 15, as permitted by the co-action between the cam follower 19 and the periphery of the cam plate 28, in particular the flank 28b between the cam nose 28c and the cam base 28a. During this movement, the spring loading unit 5 previously in the component supplying position A moves to position B, but maintains its radial position on index table 3.

Figure 4:
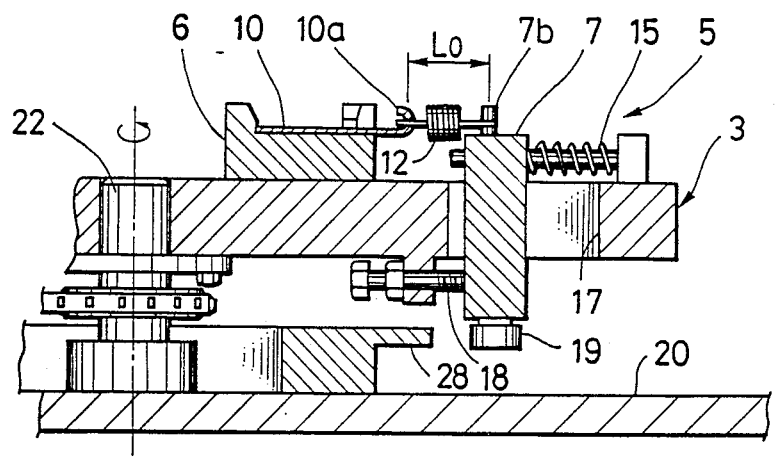

The spring loading unit 5 having been moved to the spring attaching position B is supplied with a helical extension spring 12 having an unbiased length of $L_0$ (see FIG. 4) and the helical extension spring 12 is engaged by its hooked ends 12a with the stud 10a of the plate 10 and the spring retainer stud pin 7b of the slide block 7 without expanding the helical extension spring 12 either manually or automatically. For automatically attaching the helical extension spring 12, a manipulator, which may take any of various forms well known in the art and therefore need not be described herein, is preferably used. Simultaneously, the spring loading unit 5 having been moved to the component supplying position A is supplied with another plate 10 in the same manner as described above.

Then, the motor 25 is actuated again so as to effect another 120° of rotation of the index table 3 and then stops, thereby bringing the spring loading unit 5 with both of the plate 10 and the helical extension spring 12 to the component fitting position C, the spring loading unit 5 with only the plate 10 to the spring attaching position B and the spring loading unit 5 previously in the component fitting position C to the component supplying position A. Upon a further 120° of movement of the index table 3, the spring loading unit 5 during movement from the component fitting position C to the component supplying position A shifts radially inwardly and the adjacent spring loading unit 5 during movement from the component supplying position A to the spring attaching position B maintains its radial position. However, the spring loading unit 5 moving from the spring attaching position B to the component fitting position C shifts radially outwardly by means of the sliding engagement of the cam follower 19 of the slide block 7 with the cam plate 28, in particular the flank 28b between the cam base 28a and the cam nose 28c, so that the helical extension spring 12 is lengthened to a predetermined expanded length L (see FIG. 5), creating a tension. The expanded length L, and accordingly the cam height of the cam plate defined by the radial distance between the cam base 28a and the cam nose 28c is adjusted to that distance necessary for assembling the plate 10 and the helical extension spring 12 to a second component.

Figure 5:
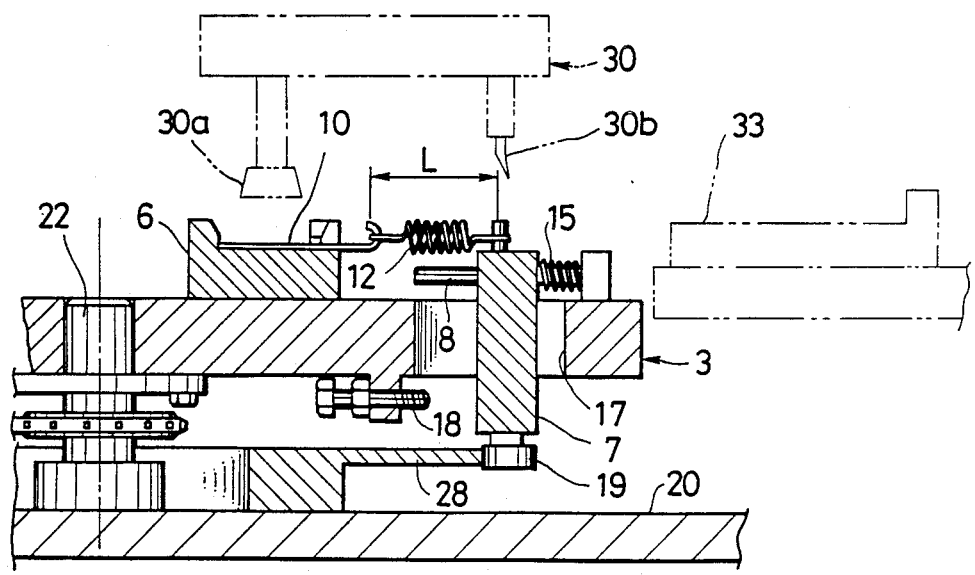

A manipulator is provided at the component fitting position C for automatically assembling the plate 10 with the helical extension spring 12 expanded to the length L to a second component. The manipulator, for example as shown in FIG. 5, includes a holding head 30 comprising an air suction holder 30a for attracting the plate 10 and a holding finger 30b engageable with that hooked end 12a of the helical extension spring 12 which is engaged by the spring retainer pin 7a. The air suction holder 30a could also be an electromagnetic holder or any of various other known plate holding means.

The manipulator lowers the holding head 30 so as to bring the air suction holder 30a into contact with the upper surface of the plate 10 and the holding finger 30b into engagement with the hooked end 12a of the helical extension spring 12. Then, the manipulator brings the plate 10 and the helical extension spring 12 toward the second component 33 for assembling, while maintaining the loading of the helical extension spring 12.

Upon removal of the plate 10 with its associated helical extension spring 12, followed by another 120° rotation of the index table 3 by the motor 25, the same procedure as described above is repeated. In this manner, every time the index table 3 makes one complete rotation, as many plates 10 as the number of spring loading units 5, for example three in this embodiment, can be assembled. The number of spring loading units is of course a design choice, and could be any desired number other than three, with suitable re-dimensioning of the cam plate 28 if necessary.

In place of the cam plate 28 for shifting the slide blocks 7, cylinders 35, such as pneumatic cylinders or hydraulic cylinders, may be used. As shown in FIG. 6, when one of the spring loading units 5 reaches the component fitting position C, the cylinder 35 is actuated to extend its piston rod 35a, thereby pushing the slide block 7 of the spring loading unit 5 outwardly so as to expand the spring 12 to the desired length L. In the case of using the cylinders 35, the index table 3 may be replaced with a pallet bearing a number of spring loading units 5 carried by a turntable system or a conveyor system.

Although the present invention has been described in connection with various preferred embodiments thereof, it will be appreciated that these embodiments are provided solely for purposes of illustration, and should not be construed as limiting the scope of the invention. Other embodiments and applications of the invention will be readily apparent to those skilled in the art from reading the present specification and practicing the techniques described herein, without departing whatsoever from the scope and spirit of the appended claims.

What is claimed is:

1. A method of interconnecting two components with a helical extension spring, comprising the steps of:
    attaching a helical extension spring to a first component;
    stretching said helical extension spring to a predetermined length;
    moving said first component with said stretched helical extension spring maintained at said predetermined length, as one integral unit, relative to a second component to which said first component with said stretched helical extension spring is to be connected; and
    connecting said stretched helical extension spring to said second component, thereby to interconnect said first and second components.

2. A method of interconnecting two components with a helical extension spring, comprising the steps of:
    securing a first component on a holding table;
    attaching a helical extension spring to said first component at a spring attaching station;
    shifting said holding table to a spring loading station such that said helical extension spring is stretched to a predetermined length upon arrival at said spring loading station;
    moving said first component with said stretched helical extension spring maintained at said predetermined length, as one integral unit, relative to a second component to which said first component with said stretched helical extension spring is to be connected; and
    connecting said stretched helical extension spring to said second component, thereby to interconnect said first and second components.

* * * * *